United States Patent Office 3,508,462
Patented Apr. 28, 1970

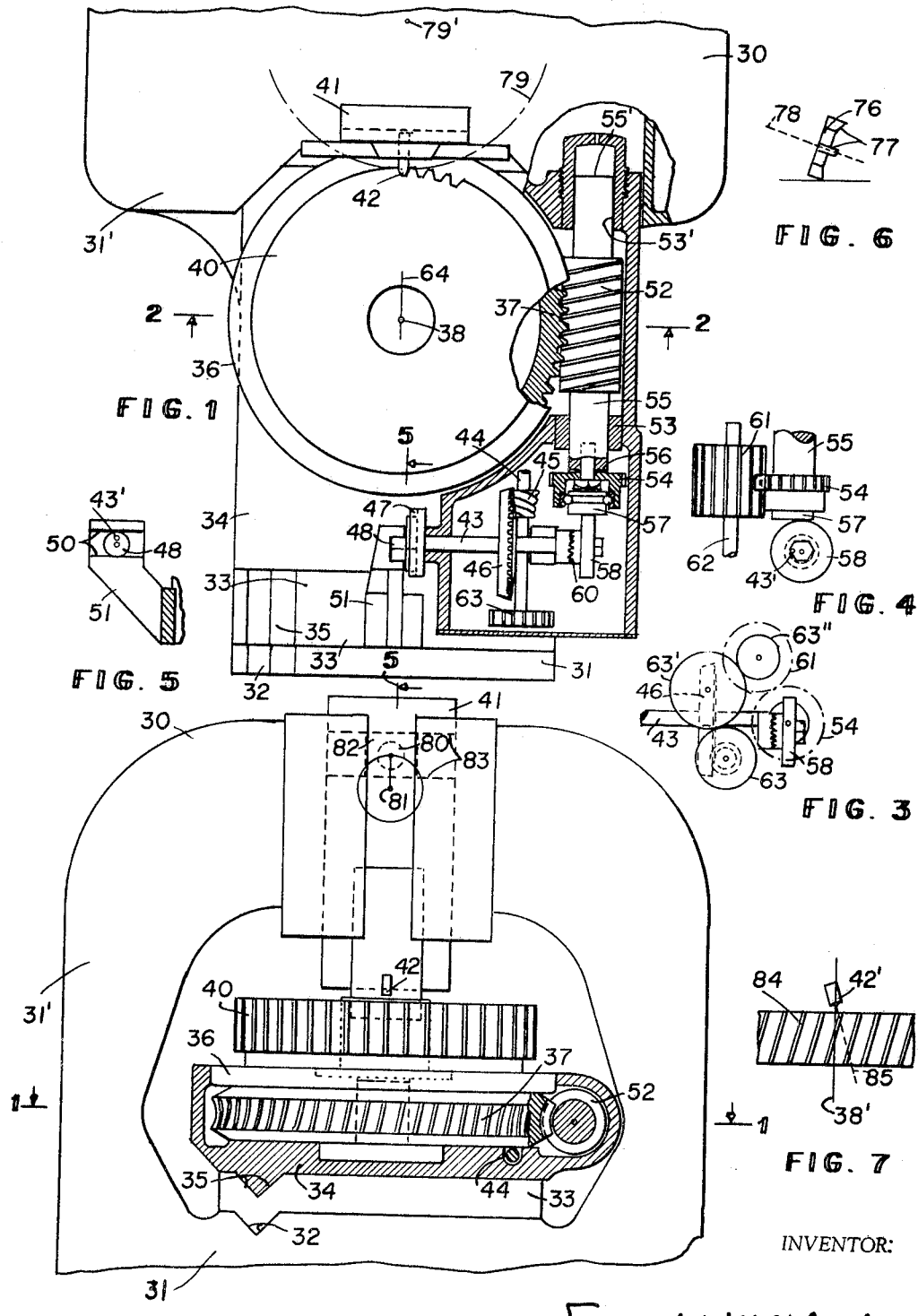

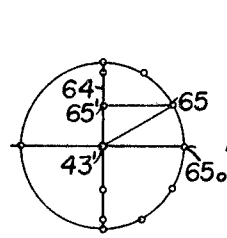
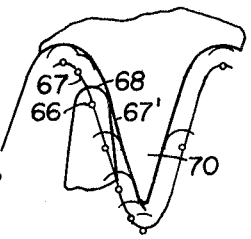
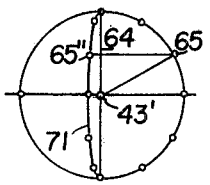
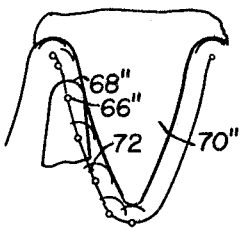
FIG. 8a    FIG. 8b    FIG. 9a    FIG. 9b
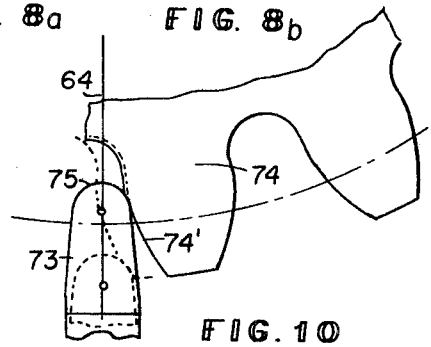
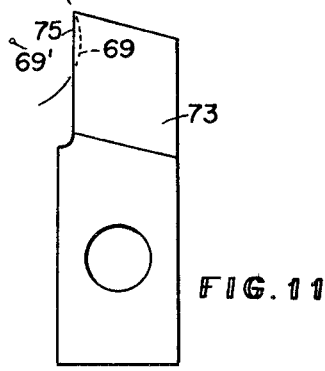
FIG. 10    FIG. 11
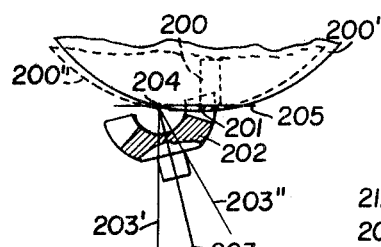
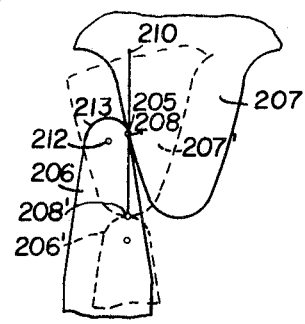
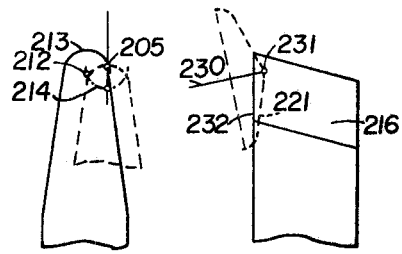
FIG. 12    FIG. 13    FIG. 14    FIG. 17
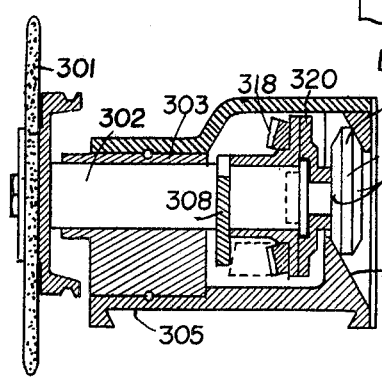
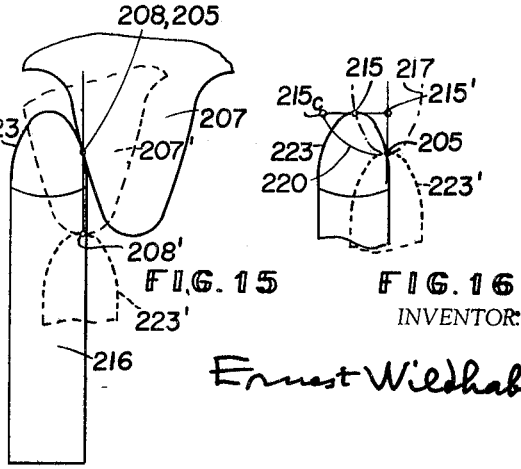
FIG. 27    FIG. 15    FIG. 16
INVENTOR:
Ernest Wildhaber

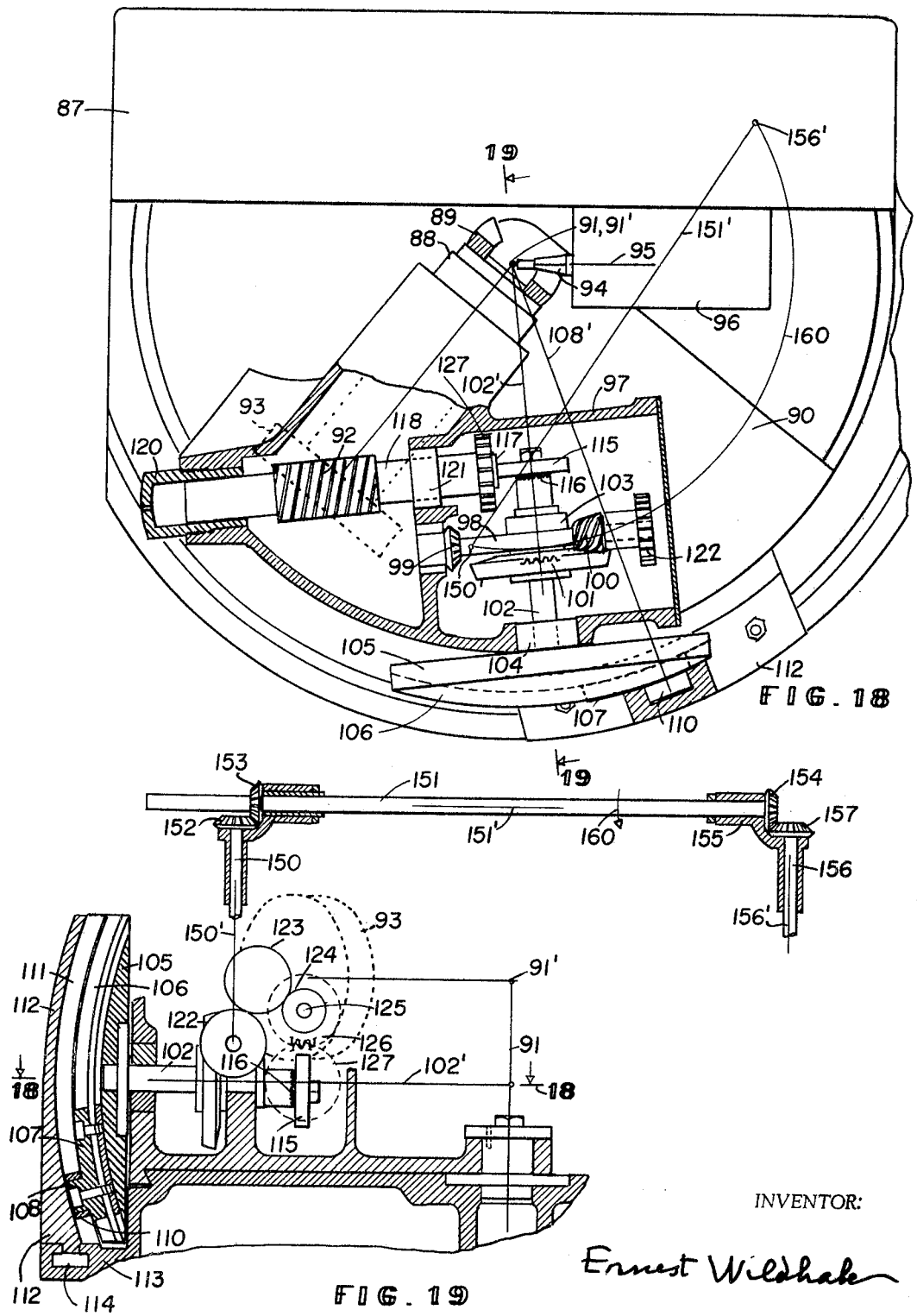

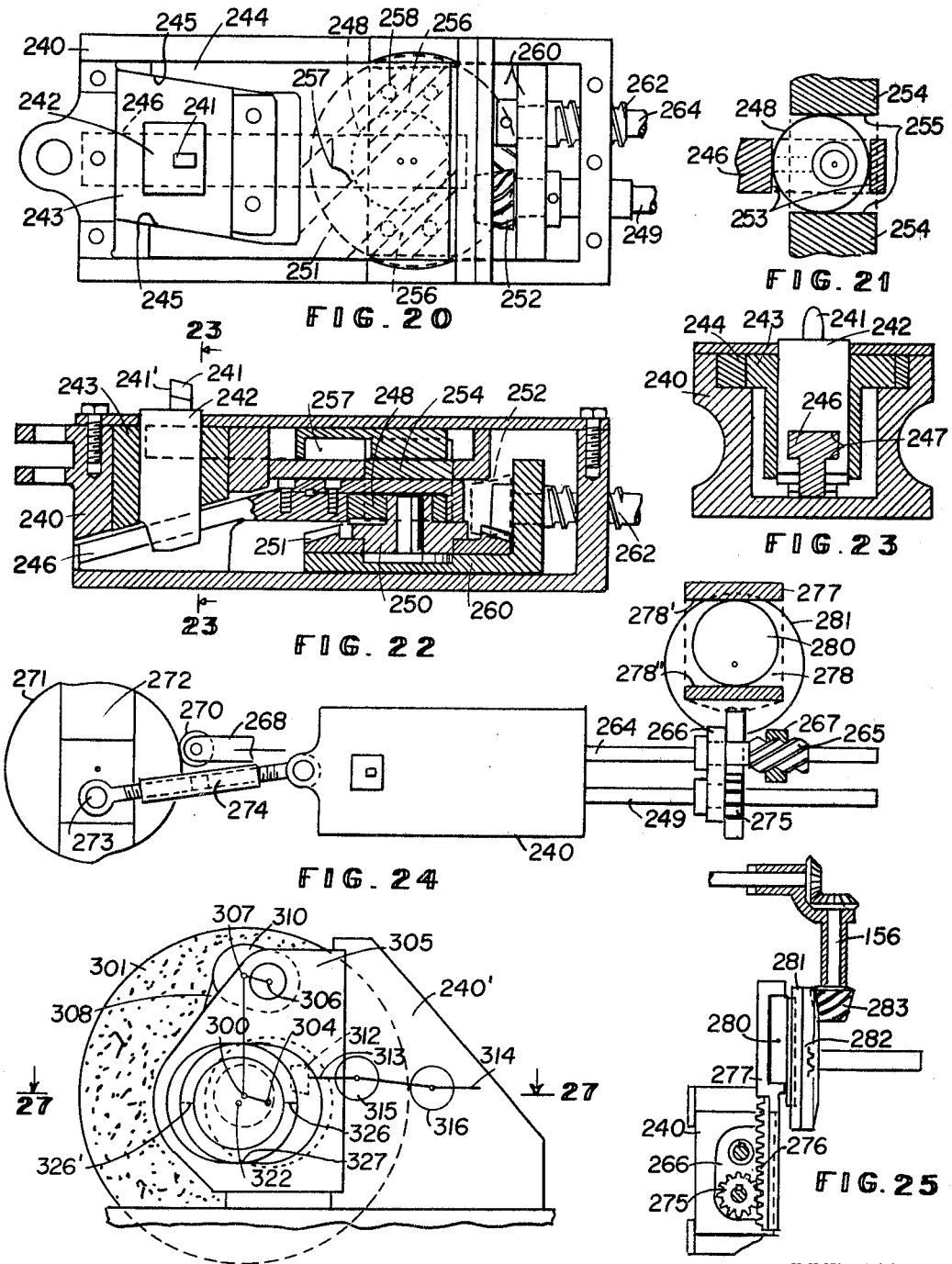

1

3,508,462
METHOD AND MEANS FOR PRODUCING TEETH AND LOBES
Ernest Wildhaber, Brighton, N.Y.
(124 Summit Drive, Rochester, N.Y. 14620)
Continuation-in-part of application Ser. No. 332,561,
Dec. 23, 1963. This application Sept. 3, 1968, Ser.
No. 767,539
Int. Cl. B23f 9/04, 5/12, 5/20
U.S. Cl. 90—8
14 Claims

ABSTRACT OF THE DISCLOSURE

A method for cutting teeth on gears and other rotary members is disclosed in which a tool of curved profile is moved longitudinally across the face of the workpiece while being fed depthwise first into and then out of engagement with the workpiece, and while the workpiece is being rotated on its axis. In one embodiment of the invention a tooth profile is cut on the in-feed and the adjacent tooth profile is cut on the out-feed, each tooth space of the workpiece being finished before the tool starts operating on the next tooth space. In another embodiment of the invention, helical teeth are produced by imparting an additional continuous rotary motion to the workpiece timed to the longitudinal movement of the tool. In this case the tool operates in different tooth spaces of the workpiece on successive strokes; and all of the teeth are finished in a single depthwise feed cycle of the tool.

---

This application is a continuation-in-part of my application Ser. No. 332,561, filed Dec. 23, 1963, now abandoned.

The present invention relates to the production of teeth on cylindrical gears and bevel gears and broadly of teeth or lobes on rotary members, and particularly to the production of the rotors of the positive-displacement units described in my copending application Ser. No. 276,285, filed Apr. 29, 1963, now Patent No. 3,236,186, issued Feb. 22, 1966.

One object of the present invention is to produce said rotors efficiently by stock removal, as by cutting or grinding.

A further object is to produce teeth, especially coarse pitch teeth, with high accuracy in a simple and economical way.

Another aim is to produce teeth on cylindrical gears with reciprocating cutting or grinding tools of simple convex profile shape, using feed motion only depthwise of the teeth and a corresponding turning motion about the axis of the workpiece.

A still other aim is to devise a method of producing teeth using only a depthwise feed motion and a turning motion about the axis of the workpiece, that does away with intermittent indexing altogether, even though it completes one tooth after the other.

A further object is to provide machine structure to carry out my method.

Other objects will appear in the course of the specification and in the recital of the appended claims.

In the drawings:

FIG. 1 is a somewhat diagrammatic and fragmentary plan view of a machine for cutting the straight teeth of spur gears, and partly a section along lines 1—1 of FIG. 2;

FIG. 2 is a front elevational view corresponding to FIG. 1 and partly a section taken along lines 2—2 of FIG. 1;

FIG. 3 is a diagrammatic and fragmentary view looking along the axis of the worm 52 from front to rear, with the cover removed;

2

FIG. 4 is a fragmentary side view looking from right to left in the direction of shaft 43 shown in FIG. 1;

FIG. 5 is a section taken along lines 5—5 of FIG. 1, looking in the direction of the arrows;

FIG. 6 is a side view of a modified form of tool;

FIG. 7 is a diagram illustrating the application of the method to the production of helical gears;

FIGS. 8a, 8b, 9a, 9b and 10 are diagrams explanatory of the principles underlying the present invention;

FIG. 11 is a side view of a reciprocatory tool that may be used in my process and that is also shown in FIG. 10. It has a circular arcuate cutting edge;

FIG. 12 is a diagram explanatory of my method as applied to tapering teeth or lobes, using reciprocating tools;

FIG. 13 and FIG. 14 are diagrams illustrating the feed motions for use of a reciprocatory tool of circular arcuate profile shape;

FIGS. 15 and 16 are diagrams illustrating the feed motions for use of a modified reciprocatory tool. The tool has an elliptical cutting profile;

FIG. 17 is a side view of such a tool;

FIG. 18 is a diagrammatic plan view, and partly a section taken along lines 18—18 of FIG. 19, of a machine for producing the tapered teeth of a rotor of one of the units above referred to, and for producing bevel-gear teeth of very coarse pitch.

FIG. 19 is a diagram and chiefly a section taken along lines 19—19 of FIG. 18.

FIG. 20 is a simplified plan view of a reciprocatory tool slide for producing tapered teeth or lobes;

FIG. 21 is a plan view of the eccentric 248 shown in dotted lines in FIG. 20, and a fragmentary section through the cooperating slides, the section being taken along the front face of the eccentric;

FIG. 22 is a longitudinal mid-section of the tool slide, taken at right angles to the drawing plane of FIG. 20;

FIG. 23 is a cross-section taken along lines 23—23 of FIG. 22;

FIG. 24 and FIG. 25 are diagrams explanatory of the operation of the depthwise and lateral tool displacements and of the tool-clapping motion, in the tool slide shown in FIGS. 20 to 23. They show the tool slide 240 in plan view and in an end view respectively; and FIGS. 26 and 27 are diagrams illustrating means for effecting such displacements on a grinding wheel, looking along the grinding-wheel axis and at right angles to it, respectively.

My process will first be described as applied to the tooth production of cylindrical gears.

The machine 30 shown in FIGS. 1 and 2 contains a bed or frame 31 with a straight guideway 32, along which a lower slide 33 is adjustable. Slide 33 carries an upper slide 34 movable thereon along a way 35 parallel to way 32. A worktable 36 carrying a worm gear 37 is mounted on the upper slide 34 to turn on an axis 38. A workpiece or gear blank 40 secured to the work table 36 is shown at the start of the roughing operation in FIG. 1 and near completion in FIG. 2.

A yoke 31', that may be formed integral with the machine frame, carries a mechanism of known type for reciprocating a slide 41. Slide 41 carries a tool 42 adjustably secured thereto and mounted in conventional manner (not shown) for clapping during the return stroke. The tool will be further described hereafter.

The means for achieving the novel feed motions will now be described.

A shaft 43 is rotatably mounted on upper slide 34 transversely of the guideways 32, 35. It receives motion from a shaft 44 extending in the direction of said guideways and that is driven in any suitable known way not further indicated. Shaft 44 contains a hypoid pinion 45 meshing with a hypoid gear 46 rigid with shaft 43. At one end shaft 43 contains a head 47 with ways and means for radial adjustment of a crank pin 48 without or preferably with roller, so that the center of pin 48 can be set to any desired distance from the axis 43' of shaft 43, (FIG. 5). The pin 48 or roller engages a straight slot 50 provided on a bracket 51 secured to the lower slide 33. Slot 50 extends in the direction of the axis 38 of the worktable.

Accordingly on uniform rotation of shaft 43 the upper slide 34 is moved in a harmonic motion along way 35 of lower slide 33 that is set in a fixed position, to move the workpiece depthwise of its teeth towards and away from tool 42, producing successive in-feed and out-feed.

Worm gear 37 of the worktable is engaged and driven by a helical worm 52 journalled in cylindrical bearings 53, 53' for rotation and also for axial displacement. A gear 54 is secured to the worm shaft 55 through a toothed face coupling 56. Gear 54 has a cup-shaped body, in which a centerpiece 57 is journalled on an antifriction bearing capable of taking axial thrust. The plane front face of piece 57 is engaged by a cam 58 eccentrically secured to an end portion of shaft 43 by a toothed face coupling 60, (FIGS. 1 and 3). Piece 57 is kept pressed against cam 58 by hydraulic pressure applied to end 55' of the worm shaft.

Gear 54 of the worm shaft meshes with a wide-faced gear 61 rigid with a shaft 62, that is parallel to shaft 44 and is geared to shaft 44 by changes gears 63, 63', 63" indicated by their pitch circles only, (FIG. 3). The gear ratio is so selected that the work table 36 turns through one pitch of the workpiece 40 per turn of shaft 43.

Thus while shaft 43 makes one turn the depthwise feed motion in direction 64 goes through one complete cycle as the workpiece turns through one pitch.

The principles underlying the present invention will now be further described with FIGS. 8 to 10.

FIG. 8a defines the nature of the depthwise feed motion between the tool and gear. Point 65 represents the center of pin 48 (FIGS. 1 and 5) that turns about axis 43' of shaft 43. The depthwise feed displacement from the mean position equals distance 43'–65', where 65' is the projection of point 65 to direction 64.

While a point 66 (FIG. 8b) moves like point 65' in direction 64 the workpiece may turn on its axis in proportion to angle 65–43'–65$_0$. Let us first consider a very, very large workpiece, a rack. Point 66 then describes a sine-curve 67 with respect to said rack. If point 66 is the center of a circular arcuate tool profile 68, the tool profile envelops a curve 67' equidistant from or parallel to sine-curve 67. It forms tooth-like projections 70 whose thickness, at mid-depth, is smaller than the space width between adjacent teeth.

Thickness and space width can be equalized by adding a lateral harmonic motion to the motion of points 65' and 66. This is indicated in FIG. 9a. Point 65" has the combined motion. It describes an ellipse 71 in space, and an arc center 66" so moved describes a curve 72 (FIG. 9b) relatively to said rack. The circular arc 68" then envelops a wider tooth 70" whose thickness matches the space width much better.

It should be understood that the said lateral harmonic motion can also be added to the motion of the workpiece, while maintaining the motion of center 66" in a straight line, in direction 64 (FIG. 9a). This is carried out by the described machine 30.

A harmonic depth feed and a turning motion of the workpiece that combines a uniform motion and a harmonic motion produces teeth and tooth profiles on a workpiece that are generally similar to the showing of FIG. 9b, but wrapped around its curved pitch surface. The required tooth profiles are more curved than these profiles, but differ only moderately therefrom. The required cam 58 differs from an eccentric only so much as to produce this moderate difference.

FIG. 10 illustrates the production of a gear tooth. As tool 73 reciprocates and is fed depthwise in radial direction 64 the workpiece 74 turns on its axis just so much that its profile 74' contacts the circular arcuate profile 75 of the tool 73. The turning motion of the workpiece is composed of a rotation proportional to the rotation of shaft 43 and an added turning motion at a vary ratio thereto. The latter is produced by cam 58. The contact between the tool profile 75 and tooth profile 74' thereby moves continuously in one direction about the axis of the workpiece, from tooth to tooth, one side of the gear teeth being produced during in-feed and the opposite side during out-feed.

FIG. 11 shows the tool 73 in a side view. Its cutting face may be the plane of arc 75, or preferably it is a concave spherical cutting face 69 centered at 69'.

The process has the simplicity of the old templet method of cutting teeth, that has been in use on large gears. But it results in a more rigid machine, a higher accuracy, higher production rate and better finish. A templet machine required a different size templet for each pitch of a given tooth number, whereas here only a single cam 58 is required for all pitches of this tooth number. Only the tool is changed for different pitches and the eccentric setting of pin 48.

Instead of a single tool 42 (FIG. 1), a tool 76 as indicated in FIG. 6 may be used, if desired, together with machine structure adapted to it. Tool 76 contains a plurality of identical cutting teeth 77 to confine tool wear. They are equally spaced about the tool axis 78. Each cutting tooth 77 acts like a single tool 42. Another tooth 77 of tool 76 may be brought into operating position by hand from time to time, by turning tool 76 on its axis and then locking or clamping it. Or the tool may be indexed automatically after each cutting stroke.

The method and machine can also be used to produce internal gears. In FIG. 1, 79 denotes the pitch circle of an internal gear whose center is at 79'.

Reciprocation of the tool slide 41 may be effected in any known way, as by a crank and connecting rod, or with a Scotch yoke as indicated: Crank pin 80 (FIG. 2) is radially adjustable with respect to the axis 81 of rotation, to vary the length of stroke. It may carry a sliding block 82 that moves in a transverse slot 83 provided on slide 41.

Preferably I use the mechanism described in my Patent No. 2,770,973, granted Nov. 20, 1956, for reciprocating tool slide 41, to effect a uniform cutting stroke. The machine 30 can then furthermore be adapted to cut also helical teeth, by adding a uniform rotation to the turning motion of the workpiece. The uniform rotation is at a rate of an integral number of tooth pitches per turn of the crankshaft.

FIG. 7 illustrates cutting helical teeth 84. The tool 42' is shown back of the workpiece, like tool 42 of FIG. 2. It is set to the helix angle of the teeth, which at the rear have an inclination opposite to the one at the front. The cutting motion is made up of a tool reciprocation parallel to the gear axis 38' and of a continuous rotation of the workpiece on its axis 38'. Cutting engagement exists during the tool stroke in one direction, during the downward stroke in FIG. 7. The tool is clapped out of engagement with the workpiece at the end of the cutting stroke, and returns to starting position while clear of the workpiece. The cutting stroke of the tool and the rotation of the workpiece are proportional to each other, and both are preferably uniform, the workpiece turning through an integral number of tooth pitches per complete reciprocation cycle of the tool, from one start to the next. The tool describes a relative path 85 at the rear, while in cutting engagement with the workpiece. It enters a different tooth space after each successive cutting stroke, as the workpiece continues to rotate.

The feed motion is depthwise of the teeth, at right angles to the axis of the workpiece. It is accompanied by an additional turning motion about the axis of the workpiece, at a varying ratio to the feed motion. The feed motion is in one direction to produce one side of the teeth, and in the opposite direction to produce the opposite side of the teeth. Said additional turning motion is continuously in the same direction. While the feed cycle is in itself the same as for straight teeth, there is but a single feed cycle for producing all the helical teeth.

Tapered members

The production of teeth or lobes on tapered members, and of tapered teeth, will be particularly described for the rotors of the units of my said application Ser. No. 276,285, with the method generally disclosed therein. The same steps and machine structure also apply to the production of bevel-gear teeth.

Machine 87 (FIGS. 18 and 19) contains a work support 88 carrying a workpiece 89 rotatably mounted thereon. It is axially adjustable on an angular slide 90 that is pivotally movable about an axis 91, which contains the apex 91' of the tapered teeth. Rotation of the workpiece is effected by means of a worm 92 journalled on slide 90 for rotation and axial displacement. Worm 92 is set at an angle and meshes with a worm gear 93 of fixed axial position, that is coaxial with and transmits its turning motion to the workpiece 89.

The workpiece is engaged by a conical milling cutter 94, or grinding wheel, with axis 95. The apex of its conical working surface coincides with apex 91'. It may be steadied by an outboard support applied at its forward end. Cutter 94 is rotatably mounted in a head 96 secured to the frame of the machine and is driven by any suitable known means not shown.

Slide 90 contains a gear box 97 in which a shaft 98 is rotatably mounted. It receives motion through a bevel gear 99. A hypoid pinion 100 is rigid with shaft 98. It meshes with a hypoid gear 101 secured to a shaft 102 offset from and at right angles to shaft 98. Its axis 102' intersects pivot axis 91. Shaft 102 is rotatably mounted in bearings 103, 104 in box 97. A head 105 is rigidly secured to shaft 102 at its outside end. It contains a circular slot 106 for adjustment of a slide 107 carrying a crank pin 108 so that the axis 108' of the pin intersects axis 102' on pivot axis 91. Pin 108 mounts a roller 110 or sliding block that engages a plane-sided circular slot 111 provided on a stationary bracket 112 that is adjustably secured to the machine frame 113. The mid-plane of slot 111 contains pivot axis 91, and bracket 112 is adjustable along T-slot 114 about axis 91. Rotation of shaft 102 moves angular slide 90 about axis 91 periodically towards and away from the tool means 94 depthwise of the teeth of the workpiece.

Shaft 102 also holds a disk cam 115 rigidly secured to it by an eccentric toothed face coupling 116. Cam 115 engages a plane-faced center piece 117 rotatable in and axially fixed to worm shaft 118. Engagement is maintained by hydraulic pressure exerted on the opposite end of the worm shaft in cylinder 120. The worm shaft is journalled in said cylinder and in a split bearing 121.

Worm shaft 118 is rotated in proportion to the rotation of shaft 98 by means of change gears 122, 123, 124 (FIG. 19). The latter is secured to a shaft 125 parallel to shaft 98. Shaft 125 contains at its opposite end a widefaced gear 126 that meshes with a gear 127 rigid with the worm shaft 118.

Accordingly the worm 92 is rotated continuously and is displaced axially to and fro at a rate of one cycle per feed cycle, that is per turn of shaft 102. This motion produces tooth surfaces composed of straight-line elements that all pass through apex 91'.

If the machine were confined to use conical tools 94 then shaft 98 could be driven from a motor mounted on slide 90. To enable it to use also reciprocatory tools after suitable replacement of the tool end, a drive connection with the tool end is required. This is diagrammatically indicated in FIG. 19 by an overhead drive. It comprises a vertical shaft 150 with axis 150', having at its lower end a bevel gear (not shown) meshing with bevel gear 99 of shaft 98. Shaft 150 is connected with a transverse telescoping shaft 151 with axis 151' through a pair of miter gears 152, 153, of which gear 153 is rotatably mounted to swivel about vertical axis 150'. Shaft 151 is axially slidable in the hub of gear 153 and is connected with it by a sliding key. The opposite end of shaft 151 carries a miter gear 154 rigid with it and journalled on a part 155. This part is mounted to swivel about a shaft 156 parallel to shaft 150 and having an axis 156'. Miter gear 154 meshes with a miter gear 157 rigid with shaft 156. Shaft 156 receives motion from a source mounted on the machine frame and not shown. This motion may be uniform or at a rate varying periodically with each feed cycle.

At a fixed angular position of slide 90 the shafts 150, 156 turn at the same speed. However in general the relative turning position of the shafts 150, 156 would be affected by the swivel motion of slide 90 about axis 91. This complicates the timing.

I have found a way to avoid this complication and to maintain the same turning position on both shafts 150, 156 regardless of the angular position of slide 90: The shafts 150, 156 are mounted at equal distances from swivel axis 91, so that their axes lie on a circle 160 (FIG. 18) drawn about axis 91. The angles 91–150'–156' and 91–156'–150' are then equal at all swivel positions of slide 90, and they change with the swivel position. Also the miter pairs 152, 153 and 154, 157 are so positioned that the two shafts 150, 156 turn in opposite directions.

Let it be assumed that slide 90 is moved about pivot axis 91 towards the tool while shaft 156 is maintained stationary. This displacement increases the said angles so that shaft 151 turns in direction of arrow 160'. Likewise, if shaft 150 is held stationary during said feed motion, the shaft 151 turns equally in direction of arrow 160' (FIG. 19). Accordingly both shafts 150, 156 remain stationary if one is held stationary while slide 90 performs its swivel motion. Both slides retain their turning positions regardless of the swivel motion. They always turn through equal angles.

Other tools

A problem is encountered with other tools for producing tapered teeth, such as the reciprocatory shaping tool 200 shown in FIG. 12 or the reciprocatory grinding tool 200' also shown in a different stroke position 200". We have to see to it that the tangent plane at a point of finishing contact always passes through the apex of the tapered teeth, to attain tooth or lobe surfaces composed of straight-line elements passing through said apex.

In FIG. 12 numeral 201 denotes a point of finishing contact between the tool and workpiece 202 that has an axis 203 and an apex 204. The tool is reciprocated in the direction of straight line 205 that passes through apex 204. The workpiece 202 is fed relatively to the tool depthwise of the teeth about apex 204, so that its axis moves from position 203' to 203" and back, while the workpiece continuously turns on its axis so that line 205 describes the tooth sides. At the same time the tool profile is so displaced that its inclination keeps matching the inclination of the tooth profile, while it continues to pass through line 205.

FIG. 13 illustrates the conditions at a larger scale, in a view taken in the direction of reciprocation. Tool 206 contacts the tapered workpiece-tooth 207 at point 208 of line 205. In this figure the workpiece is shown turning only on its axis, while the feed motion is performed by the tool and by the line 205 of finishing contact. Line 205 gradually describes the tooth surfaces being produced as it is fed in plane 210. Dotted lines 206' show the tool in a different feed position. Tooth 207 is then in the dotted position 207', contact being at 208'.

FIG. 14 illustrates the displacement of the tool with respect to line 205 of finishing contact. The center 212 of the circular tool profile 213 gradually moves in a circular arc 214 about line 205. The tool 206 itself may remain in a parallel position, and thus perform a circular translation.

FIG. 15 shows a tool 216 with modified cutting profile 223, which is part of an ellipse. It contacts tooth 207 at point 208 of the finishing line 205. It is less curved on its sides than the circular profile 213 and produces an improved finish on the tooth sides. Also it will show less wear. In the feed position shown in dotted lines 223' it contacts tooth 207' at 208'.

FIG. 16 shows the tool displacement with respect to the line 205 of finishing contact. When the tool is maintained in parallel positions, as shown, any of its points, such as point 215 describes an equal curve 217 which is part of an ellipse identical with the ellipse of the tool profile 223. It is seen that the cordinates 215–215', 215'–205 of curve 217 are the same as the coordinates of the ellipse 223. The ordinate 215'–205 is equal to the ordinate of point 215c of a circle 220. And the abscissa 215–215' is at a constant proportion to the abscissa 215c–215' of point 215c. The coordinates can be obtained as the coordinates of a circle, where the abscissas are plotted at a scale different from the scale of the ordinates.

The tool 216 may have a plane cutting face identical with the plane 232 of the elliptical tool profile. However, as the ellipse is a conic section, it can also be produced as the intersection of a conical cutting face with the relieved side surfaces of the tool. FIG. 17 shows a concave conical cutting face 221, with axis 230 and apex 231. It is somewhat rounded off adjacent the apex.

Reciprocatory grinding wheels are displaced with respect to the finishing line 205 like tool 216.

Tool slide

FIGS. 20 to 23 show a reciprocatory tool slide 240 designed for the described tool displacements. The tool 241 with cutting face 241' is mounted in a holder 242 that is movable in a direction depthwise of the teeth, at right angles to the slide motion. Holder 242 is mounted on a slide 243 movable on the tool slide 240 in a transverse or lateral direction, at right angles to the tool stroke. The position of slide 243 is controlled by wedge action of a slide 244 movable on tool slide 240 in the direction of the tool stroke. It contains inclined plane surfaces 245 that engage the inclined ends of slide 243. Thus displacement of slide 244 displaces slide 243 and tool 241 laterally. The depthwise position of tool 241 and holder 242 is effected by a sliding part 246 that engages an inclined T-slot 247 provided on holder 242 (FIG. 23). Part 246 is movable lengthwise of the stroke motion. Forward displacement of part 246 moves tool 241 out; rearward displacement retracts it.

The positon of slide 243 and part 246, and therefore the lateral and depthwise position of the tool 241, are controlled by an eccentric 24 that is secured to a rotatable member 250. There is one eccentric for each tool profile, or else an adjustable eccentric would have to be used. Preferably the tool profiles are all equally proportioned and vary only in size. The eccentricity is then proportional to the size. Member 250 contains a hypoid gear 251 engaged by a hypoid pinion 252 whose shaft 249 extends in the direction of the stroke. How the pinion 252 is turned will be described hereafter.

The eccentric 248 acts directly on part 246, which contains a straight slot with parallel plane sides 253 (FIG. 21) extending transversely of the stroke direction. A sliding element 254 is movable transversely of the stroke direction and engages the eccentric with a plane-sided slot 255. Slot 255 extends in the stroke direction. Element 254 transmits its motion to slide 244 in any suitable known way. As shown, it contains a pair of diagonal plane-sided projections 256 engaging diagonal slots 257 (FIGS. 20, 22) provided in slide 244, through cylindrical rollers 258. Stops may be provided to keep the rollers in position.

When producing the mid-portion of the tooth bottom, the turning position of eccentric 248 differs by half a turn from the position shown.

When the tool has a circular profile, the inclination of the wedge surfaces is so selected that equal displacements of part 246 and element 254 (FIG. 21) result in equal depthwise and lateral displacements of the tool. When an elliptical tool profile is used with major axis in depthwise direction, then the depthwise and lateral displacements of the tool at equal displacements of part 246 and element 254 should be in the proportion of the major and minor axes of the ellipse respectively. The amount of these displacements is governed by the eccentricity of the eccentric 248.

The tool slide is guided by ways extending in its longitudinal direction and not shown.

Part 246 may also be used for clapping, that is for retracting the tool during the return stroke and advancing it again for the working stroke. To this end the hypoid pair 251, 252 is mounted on a slide 260 moderately movable on tool slide 240 in the stroke direction, that is in the direction of slot 255 (FIG. 21). It does not affect the lateral tool position. It affects however the depthwise position of the tool. Withdrawing slide 260, to the right in FIG. 22, lowers the tool. This clapping motion is repeated with every stroke. It is effected by a screw 262 engaging a nut rigid with the tool slide 240. Screw 262 is rotatably mounted on slide 260 and is axially fixed thereon. It is part of a shaft 264 that extends in the direction of the stroke and that is slidably splined to a helical gear 265 (FIG. 24). Gear 265 is rotatably mounted in an axially fixed position on a stationary bracket 266. The helical teeth of gear 265 are engaged by a nut 267 of counterpart shape. Nut 267 is secured to a push rod 268, shown fragmentarily, containing a roller 270. This roller is spring-pressed against a cam 271 provided on the outside periphery of the crank head 272. The latter contains a radially adjustable crank pin 273 for operating the reciprocation of tool slide 240, as by means of a connecting rod 274. Cam 271 can also be shaped to effect crowning of the teeth, if desired.

Shaft 249 of hypoid pinion 252 is journalled on slide 260, to which it is axially fixed. And it is slidably splined to a gear 275 rotatably mounted on stationary bracket 266 in an axially fixed position. Gear 275 is turned by a rack 276 (FIG. 25) of a slide 277. Slide 277 contains a slot 278 (FIG. 24) whose plane sides 278', 278" are engaged by a cam 280 with one or a pair of cam tracks, one track engaging side 278' and the other track engaging side 278". Cam 280 is radially adjustable for eccentricity on a rotatable head 281. Head 281 (FIG. 25) is rigid with a hypoid gear 282 meshing with a hypoid pinion 283 that is rigidly secured to shaft 156 of the described overhead drive. The tooth ratio of the hypoid pair 282/283 is the same as the tooth ratio of the hypoid pair 101/100 of the feed drive, so that the heads 281 and 105 turn at a one to one ratio. Thus head 281 turns around once per feed cycle. It produces a cycle of swing of eccentric 248. The cam 280 and the cam position are computed to produce the turning motion of the eccentric 248 that corresponds to the inclination of the tooth profile at the point of finishing contact.

The angular fed motion about axis 91 (FIG. 18) and the turning motion about the axis of the workpiece are so timed at a varying ratio that the straight stroke line 205 (FIG. 12) describes the tooth surfaces to be produced, while the tool is displaced depthwise and laterally as described, so that the inclination of its working profile at line 205 keeps matching the inclination of the tooth surfaces at line 205.

Modification

A modified embodiment for producing the required tool displacement will now be described with FIGS. 26 and 27, particularly as applied to a grinding tool or wheel. FIG. 26 is a diagrammatic view taken from the rear along the wheel axis, from the right in FIG. 27. FIG. 27 is a side view and axial section.

The spindle of the grinding wheel 301 is mounted on a sleeve part 302 (FIG. 27) that is axially movable in a pivoted holder 303. The wheel axis 300 (FIG. 26) is eccentric of and parallel to the pivot axis 304 of said holder. Holder 303 is carried on a slide 305 used to advance the grinding wheel for dressing. After dressing the slide 305 is clamped to the reciprocatory tool slide 240'.

Axis 306 is parallel to pivot axis 304 and vertically displaced therefrom on slide 305. Arm length 306–307 is equal to eccentricity 300–304, and the connecting line 300–307 equals distance 304–306. Accordingly line 300–307 remains parallel to itself in all angular positions of arm 300–304 and performs a circular translation. In the axial view, FIG. 26, the sleeve part 302 moves like line 300–307 and appears rigid with it. It contains an arm 308 that connects the centers 300, 307 and is pivotally attached at 307 to a lever 310 pivoted at 306 on slide 305. The attachment is by a ball sleeve (not shown) so as to permit axial displacement of the part 302.

A hypoid pinion 312 is rotatably mounted on sleeve part 302 on an axis 313 that extends in the stroke direction of tool slide 240'. It is turned by a shaft with axis 314 parallel to axis 313 and having a fixed level on the tool slide 240'. The connection is by a pair of universal joints diagrammatically indicated at 315, 316 and a connecting shaft.

Pinion 312 meshes with a hypoid gear 318 (FIG. 27) rotatably mounted on sleeve part 302 coaxial with the wheel axis 300. Gear 318 and the sleeve part 302 are axially fixed to each other and have the same axial displacement. A flanged part 320 is rigid with gear 318. It carries an eccentric 321 rigidly secured to it, with axis 322 (FIG. 26). The eccentric contains a cylindrical outside surface 323 (FIG. 27) and a pair of opposite conical side surfaces 324, all coaxial. The inclination or cone angle of said side surfaces depends on the shape of the tools to be used. It is 45 degrees for tools with circular working profile. It is smaller for tools with elliptical profile, to produce the decreased lateral tool motion described.

The opposite conical side surfaces 324 are engaged by a pair of parallel inclined planes 325 provided on slide 305 or on a part secured thereto. The displacement component of eccentric 321 in the drawing plane of FIG. 27 moves the eccentric and the sleeve part 302 with wheel 301 in the direction of the wheel axis. One side surface 324 contacts along line 326 (FIG. 26), the opposite side surface contacts along line 326' with planes 325. The outside cylindrical surface 323 engages parallel plane sides 327 of slide 305. This engagement controls the grinding wheel position in depthwise direction, that is in the direction of adjustability of slide 305. The axis 322 of the eccentric is constrained by the plane sides 327 to keep on the level of the pivot axis 304, while the wheel axis 300 is displaced from said level in dependence of the turning angle of the eccentric.

While in the diagrammatic FIGURES 26, 27 I have shown plain bearings, antifriction bearings may be used for ease of operation.

In the embodiment of FIGS. 26 and 27 the eccentric 321 is seen to provide the depthwise and lateral tool displacement directly, whereas in the embodiment described with FIGURES 20 to 25 the eccentric 248 acts through wedge members. Both embodiments can be applied to either cutting tools or grinding wheels.

The described tool displacements occurring during the feed cycles permit producing tapered straight teeth on rotary members, including bevel gears, with reciprocating tools. By adding a continuous rotation of the work support, as described for helical gears, teeth inclined to axial planes may also be produced.

One characteristic of the described process is the shape of the working profile of the tool. The working profile lies in a single convex curve that occupies both sides and the end of the tool. The total change of direction of said curve between opposite end points of said working profile is in excess of a right angle and even in excess of 135 degrees. The working profile is the profile of the slot described by each tool stroke. On a grinding wheel it is the profile of an axial section. On a reciprocatory cutting tool it may be the cutting edge itself. The shown working profiles are continuous curves, circular arcs or ellipses. For cutting gear teeth these may be flattened out at their ends, if desired.

While the invention has been described in connection with different embodiments thereof, it is capable of further modification, and this application is intended to cover any variations, uses, or adaptations of the invention, following, in general, the principles of the invention and including such departures from the present disclosure as to come within known or customary practice in the art to which the invention pertains and as may be applied to the essential features hereinbefore set forth and as fall within the scope of the invention or the limits of the appended claims.

Having thus described my invention, what I claim is:

1. The method of producing teeth of curved profile in cross section, spaced about an axis, which comprises
   mounting tool means and a workpiece in operative relation to each other,
   operating said tool means for stock removal,
   effecting feed motion between said tool means and workpiece at an angle to the axis of the workpiece depthwise of the teeth of the workpiece alternately in opposite directions to move said tool means and workpiece together and apart while in engagement with each other, to attain successive in-feed and out-feed, and
   turning said workpiece on its axis,
   said turning motion of the workpiece and said feed motion being at a continuously varying ratio and being timed to move tool engagement always in the same direction about the axis of the workpiece while keeping engagement on one side of the teeth during in-feed and on the opposite side of the teeth during out-feed.

2. The method according to claim 1 for producing straight teeth on spur gears, wherein
   the tool means are reciprocated in a straight path parallel to the axis of the workpiece, and
   said feed motion is radial of the workpiece.

3. The method according to claim 1, wherein the turning motion of the workpiece and the feed motion depthwise of the teeth of the workpiece are both performed at a varying rate.

4. The method of producing helical teeth on cylindrical gears, which comprises
   mounting tool means having a working portion of convex profile and a workpiece in operative relation to each other,
   reciprocating said tool means in a straight path parallel to the axis of the workpiece,
   while turning said workpiece continuously on its axis in proportion to the operative displacement of said tool means along said path,
   said turning motion being through an integral number of tooth pitches per complete reciprocation cycle of the tool means, so that the tool means enters a different tooth space on each successive reciprocation cycle,
   effecting feed motion between said tool means and said workpiece in a direction at a right angle to the axis of the workpiece, while additionally turning the workpiece on its axis at a varying proportion to said feed motion, said feed motion being in one direction to produce one side of all the teeth and then in the opposite direction to produce the opposite sides of the teeth, while said additional turning motion continues in one direction.

5. The method of producing on a rotary member teeth inclined to axial planes of said member, which comprises mounting tool means having a working portion of convex profile and a workpiece in operative relation to each other, reciprocating said tool means in a straight path that lies in a plane containing the workpiece axis, while continuously turning said workpiece on its axis in proportion to the operative displacement of said tool means along said path, said turning motion being through an integral number of tooth pitches per complete reciprocation cycle, effecting feed motion between said workpiece and tool means in said plane to relatively move workpiece and tool means first together and then apart, while additionally turning the workpiece continuously in one direction at a varying proportion to said feed motion, whereby one side of all the teeth are produced during feed in one direction and the opposite side during feed in the opposite direction.

6. The method of producing tapered teeth on a workpiece, which comprises mounting tool means and a workpiece adjacent each other, operating said tool means for stock removal, effecting feed motion between said tool means and workpiece about an axis intersecting the workpiece-axis to relatively move workpiece and tool means successively together and apart while in engagement with each other, thereby attaining successive in-feed and out-feed, and turning said workpiece on its axis, said turning motion of the workpiece and said feed motion being timed to move engagement continuously in the same direction about the workpiece axis, so that one side of the teeth is produced during in-feed and the opposite side is produced during out-feed.

7. The method of producing tapered teeth on a workpiece, which comprises mounting reciprocatory tool means having a working portion of convex profile and a workpiece adjacent each other, reciprocating said tool means along a straight line that intersects the axis of the workpiece at the apex of said tapered teeth, at least approximately, effecting feed motion between said workpiece and tool means about an axis intersecting the axis of the workpiece and about the workpiece axis so that said straight line describes the tooth surfaces to be produced, and displacing said tool means so that the inclination of said working profile at said straight line keeps matching the inclination of said tooth surfaces at said straight line.

8. The method of producing tapered lobes or teeth, which comprises mounting a workpiece and tool means adjacent each other, operating said tool means for stock removal, turning said workpiece on its axis, and effecting feed motion between said workpiece and tool means about an axis intersecting the workpiece axis to periodically move workpiece and tool means together and apart while in engagement with each other, said turning motion of the workpiece and said feed motion being timed to move the engagement continuously in the same direction from lobe to lobe and through one pitch per feed period.

9. The method according to claim 8, wherein the axis of the feed motion intersects the axis of the workpiece at right angles.

10. The method of producing lobes on rotors that are to run on axes intersecting at an apex, which comprises positioning a rotary tool member having a conical working surface adjacent a rotor blank with the apex of the extended conical working surface coinciding with the apex of said rotor, rotating said tool member for stock removal, turning said blank on its axis, and effecting feed motion between said blank and said tool member about an axis intersecting the axis of said blank at said apex to periodically move blank and tool member together and apart while in engagement with each other, said turning motion of the blank and said feed motion being timed to move the engagement continuously in the same direction from lobe to lobe.

11. The method of producing lobes or teeth on rotary parts that are to run on axes intersecting at an apex, which comprises mounting a workpiece and tool means adjacent each other, said tool means having a curved working profile that is convex at the end facing said workpiece, moving said tool means lengthwise of said lobes to remove stock, turning said workpiece on its axis, effecting feed motion between said workpiece and tool means about said apex in time with said turning motion of the workpiece and at a rate varying so that a predetermined point describes a mean lobe profile, and displacing said tool means to keep engaging said lobe profile continuously at said point.

12. The method according to claim 11, wherein said working profile is a circular arc, and wherein said tool means is displaced so that the center of said arc moves in a circular arc about said point.

13. The method according to claim 11, wherein said tool means is reciprocated lengthwise of said lobes along a line passing through said apex.

14. The method according to claim 11, wherein said working profile has a varying curvature, being convex and most curved at its end and being less curved on both sides.

References Cited

UNITED STATES PATENTS 2,474,393  6/1949  Cobb _____ 90—8

GIL WEIDENFELD, Primary Examiner

U.S. Cl. X.R.

90—9